(No Model.)
M. W. PARRISH & W. R. COLE.
DYNAMO ELECTRIC MACHINE.
No. 391,070. Patented Oct. 16, 1888.
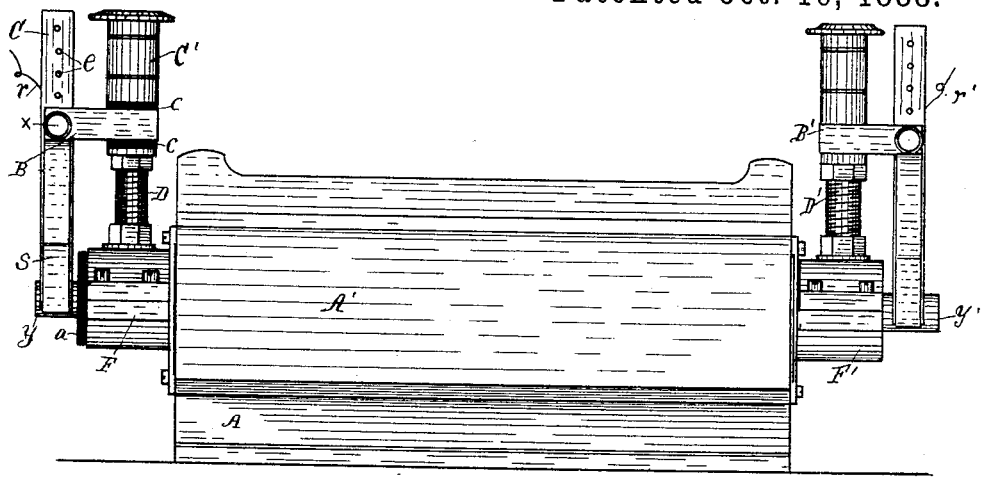
Fig. 1
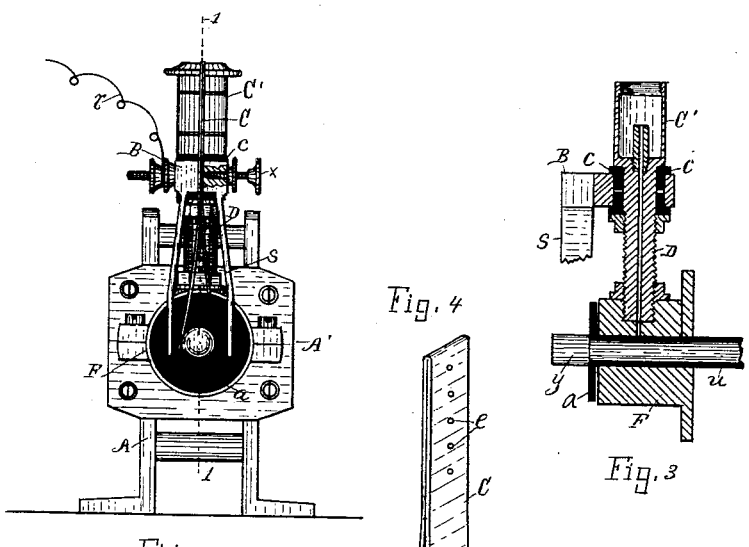
Witnesses.
John C. Perkins
Clare Williams
Inventor.
Myron W. Parrish, Wm. R. Cole,
By Lucius C. West,
Atty.

UNITED STATES PATENT OFFICE.

MYRON W. PARRISH AND WILLIAM R. COLE, OF DETROIT, MICHIGAN, ASSIGNORS TO THE PARRISH BROS. AND PECK'S ELECTRICAL COMPANY, OF SAME PLACE.

DYNAMO-ELECTRIC MACHINE.

SPECIFICATION forming part of Letters Patent No. 391,070, dated October 16, 1888.

Application filed September 12, 1887. Serial No. 249,485. (No model.)

*To all whom it may concern:*

Be it known that we, MYRON W. PARRISH and WILLIAM R. COLE, citizens of the United States, residing at Detroit, county of Wayne, State of Michigan, have invented a new and useful Electrical Generator, of which the following is a specification.

This invention relates to magneto-electric generators in which elastic conducting-plates are employed in contact with the revoluble shaft of the armature; and it has for its objects the below described and claimed conducting-plates and their support, designed to facilitate the taking off of the current generated by magneto-electrical machines.

In the drawings forming a part of this specification, Figure 1 is a side elevation; Fig. 2, an end elevation looking from a point at the left of Fig. 1; Fig. 3, a vertical section on line 1 1 in Fig. 2, and Fig. 4 shows the conducting-plates in perspective.

Referring to the lettered parts of the drawings, A' is a case which incloses the armature. The armature and magnets are not here shown, but, being of the ordinary style used in this class of generators, will be readily understood. It will be understood, as well, that the inner ends of the shafts $y$ $y'$ are attached to the armature within said case, and that said shafts and armature revolve together, as heretofore. The case A' is supported by the base A.

The shaft $y$ is insulated from the bearings F by insulation, $u$, Fig. 3. Attached to the bearings F is an upright standard, D, and B is an arm or bracket projecting forward from said standard. The end of said arm is slitted or provided within a channel, into which the forked elastic conducting-plate C is inserted and detachably held therein by set-screw $x$.

At $e$ is a series of indentations, into one of which the end of the set-screw $x$ is inserted. By this means the plate is held at different heights when desired and can be lowered when the lower end becomes worn; but these indentations may or may not be employed.

The forked conductor C is above the shaft $y$ and hangs vertically and straddles the end of said shaft, forming an elastic-pressure contact with its two opposite sides. Of course elastic conducting-plates have before been employed in different ways in connection with the revoluble shaft; but by the arrangement and construction here shown, in which the conductors hang in a vertical position astride of the shaft, the plates are not so liable to be sprung or jarred away from contact with said shaft, and at least one of the plates is always sure to form a connection with the shaft should their upright support or bracket become canted or jarred from its normal position. This we have found very important, as we have constructed this generator especially for use on railway-engines to supply electricity for a certain system of bell-cords, the jarring and commotion of which engines are so liable to interfere with a sure and proper connection of the conducting-plates. Then, too, from inadvertence and accidents of the engineer and fireman in performing their duties the proper contact of the conducting-plates of the ordinary construction would be liable to be interfered with. The bars S, pendent from the bracket B—one on each side—Fig. 2, serve to protect the plates C.

At $a$ is an insulation between the end of the box F and the forked conductor C to prevent any contingent connection between these parts caused by misplacement of the conducting-plates or accumulation of cinders.

In Fig. 3 the right or inner end of the shaft $y$ and insulation, $u$, are shown broken near the point where the armature (not shown) would be attached.

One of the terminals, $r$, of the circuit-wire is attached to the bracket B, Fig. 2. The other end of the generator—right-hand end of Fig. 1—is constructed like the left-hand end, except at the right-hand end no insulation whatever is employed. As here shown, the other terminal, $r'$, of the circuit is attached to the bracket B'; but so far as this is concerned the bracket B' and its support and conducting-plates may, if preferred, be dispensed with and the terminal $r'$ be attached to the box F' or to some other metal portion at this end; but we prefer to make it as here shown.

The upright supports D and D', as here shown, are hollow and constitute an eduction-tube to the oil-cup C', attached to the upper end, Fig.

3, for the purpose of lubricating the bearings of the revoluble shaft, thus making the supports perform two functions; but, if preferred, these supports may be solid and the shafts be otherwise lubricated so far as supporting the forked conducting-plates is concerned.

It should have been hereinbefore stated that the forked conductor C is insulated from its support. This we accomplish by insulating the bracket B from the standard or support D by the insulation, c c. From the broken terminals r r' of the circuit in connection with the generator, as described, it will appear obvious that a circuit is established over the wire and connecting parts.

Having thus described the invention, what we claim, and desire to secure by Letters Patent, is—

1. In a magneto-electrical generator, pendent conducting-plates supported above the revoluble shaft of the generator straddle of said shaft and contacting with its sides, substantially as set forth.

2. In combination, the revoluble shaft, a bearing box for said shaft, said shaft being insulated from said box, an upright standard above the shaft and its bearings, an arm or bracket projecting from the standard and insulated therefrom, and a forked elastic conductor pendent from the bracket and straddle of the shaft, substantially as set forth.

3. In combination, the revoluble shaft, a bearing therefor insulated from said shaft, the upright standard, a bracket projecting from said standard, the pendent elastic conducting-plates, and insulation between the end of the shaft-bearing and said plates, substantially as set forth.

4. In combination, the armature case having a bearing-box at each end, the revoluble shaft ends in said bearings, one of the ends insulated from its bearings, an upright standard, and pendent conducting-plates at each end of the case above the shaft and straddle thereof, the plates at the end where the insulated bearings are being insulated from their standard, substantially as set forth.

5. In combination, a revoluble shaft, a bearing therefor, an oil-cup, a hollow standard forming an eduction-stem from the oil-cup into the bearings of the shaft, and the elastic conducting-plates supported by said combined oil-cup stem and plate-supporting standard, substantially as set forth.

6. In a generator, the combination of the revoluble shaft, the plate-supporting bracket above the shaft provided with the pendent guards, and the forked conductor between said guards and straddle of the shaft, substantially as set forth.

In testimony of the foregoing we have hereunto subscribed our names in presence of two witnesses.

MYRON W. PARRISH.
WILLIAM R. COLE.

Witnesses:
JAS. WHITTEMORE,
A. BARTHEL.